US010057573B2

(12) United States Patent
Yoshino et al.

(10) Patent No.: US 10,057,573 B2
(45) Date of Patent: Aug. 21, 2018

(54) MOVING IMAGE CODING DEVICE, MOVING IMAGE DECODING DEVICE, MOVING IMAGE CODING METHOD AND MOVING IMAGE DECODING METHOD

(71) Applicant: KDDI CORPORATION, Tokyo (JP)

(72) Inventors: Tomonobu Yoshino, Fujimino (JP); Sei Naito, Fujimino (JP)

(73) Assignee: KDDI CORPORATION, Tokyo (JP)

(*) Notice: Subject to any disclaimer, the term of this patent is extended or adjusted under 35 U.S.C. 154(b) by 379 days.

(21) Appl. No.: 14/994,400

(22) Filed: Jan. 13, 2016

(65) Prior Publication Data
US 2016/0127727 A1    May 5, 2016

Related U.S. Application Data

(63) Continuation of application No. PCT/JP2014/075639, filed on Sep. 26, 2014.

(30) Foreign Application Priority Data

Sep. 30, 2013  (JP) ................................ 2013-203965

(51) Int. Cl.
H04B 1/66 (2006.01)
H04N 19/11 (2014.01)
(Continued)

(52) U.S. Cl.
CPC ........... *H04N 19/11* (2014.11); *H04N 19/136* (2014.11); *H04N 19/157* (2014.11);
(Continued)

(58) Field of Classification Search
CPC .... H04N 19/11; H04N 19/136; H04N 19/176; H04N 19/44; H04N 19/593; H04N 19/157; H04N 19/65
(Continued)

(56) References Cited

U.S. PATENT DOCUMENTS 9,008,173 B2    4/2015  Matsuo et al.
2011/0090960 A1*  4/2011  Leontaris ............. H04N 19/103
375/240.12

FOREIGN PATENT DOCUMENTS

CN    101822062 A    9/2010
JP    2008-245088 A    10/2008
(Continued)

OTHER PUBLICATIONS

Extended European Search Report dated May 12, 2017, for European Patent Application No. 14847929.8. (8 pages).
(Continued)

*Primary Examiner* — William C Vaughn, Jr.
(74) *Attorney, Agent, or Firm* — Fitch, Even, Tabin & Flannery LLP

(57) ABSTRACT

A moving image coding device includes: a evaluation unit configured to approximate a parameter of a statistic in accordance with a distance from a reference pixel located along the intra prediction direction to a pixel to be processed; a feature amount calculation unit configured to calculate, for a pixel near the pixel to be processed, a feature amount of a prediction value that is based on the intra prediction direction; and a prediction value calculation unit configured to estimate a prediction error corresponding to the distance using the parameter of the statistic approximated by the evaluation unit, reflect the prediction error in the prediction value that is based on the intra prediction direction using the feature amount calculated by the prediction value feature amount calculation unit, and generate a new prediction value.

24 Claims, 12 Drawing Sheets

(51) Int. Cl.

| | | |
|---|---|---|
| *H04N 19/176* | (2014.01) | |
| *H04N 19/593* | (2014.01) | |
| *H04N 19/136* | (2014.01) | |
| *H04N 19/157* | (2014.01) | |
| *H04N 19/44* | (2014.01) | |
| *H04N 19/65* | (2014.01) | |

(52) U.S. Cl.
CPC .......... *H04N 19/176* (2014.11); *H04N 19/44* (2014.11); *H04N 19/593* (2014.11); *H04N 19/65* (2014.11)

(58) Field of Classification Search
USPC .......................................................... 375/240
See application file for complete search history.

(56) References Cited

FOREIGN PATENT DOCUMENTS

| JP | 2008-271422 A | 11/2008 |
|---|---|---|
| WO | 2005/107267 A1 | 11/2005 |
| WO | 2009/051091 A1 | 4/2009 |

OTHER PUBLICATIONS

Wang et al.; "A Prediction-Transformation-Combined Intra Picture Coding Method"; 2012 Picture Coding Symposium (PCS 2012); Krakow, Poland; May 7-9, 2012 (4 pages).

Matsuo et al.; "Weighted Intra Prediction"; 33. VCEG Meeting; 82.MPEG Meeting; Oct. 20, 2017; Shenzhen (4 pages).

Wiegand et al.; "Overview of H.264/AVC Video Coding Standar"; IEE Transactions on Circuits and Systems for Video Technology, IEE Service Center, Piscataway, NJ US; Jul. 1, 2013 (17 pages).

International Search Report dated Nov. 18, 2014 for PCT/JP2014/075639 and English translation of the same. (2 pages).

Matsuo et al.: "Intra prediction with spatial gradient": Visual communications and Image Processing 2009: 2009, 01: vol. 7257: pp. 1-9.

Cha et al.: "Improved Combined Inter-Intra Prediction Using Spatial-Variant Weighted Coefficient": 2011 IEE International Conference on Multimedia and Expo (ICME), 2011, 07: pp. 1-5.

Bross et al: JCTVC-L1003_v34: High Efficiency Video Coding (HEVC) text specification draft 10 (for FDIS & Last Call): Jan. 2013.

ITU-T: Series H Audiovisual and Multimedia Systems Infrastructure of audiovidual service—Coding of moving video "Advanced video coding for generic auditovisual services": Feb. 2014.

Wang et al: "A Novel Weighted Cross Prediction for H. 264 Intra Coding": ICME 2009: pp. 165-168.

Yu et al.: "Distance-based Weighted Prediction for H.264 Intra Coding": ICLIP2008: pp. 1477-1480.

Cha et al: "Improved Combined Inter-Intra Prediction Using Spatial-Variant Weighted Coefficient": 2011.

Chinese Office Action dated Mar. 19, 2018 concerning the corresponding Chinese Patent Application No. 201480051187.6 (8 pages).

\* cited by examiner

FIG. 5

PIXEL VALUES OF INPUT IMAGE

| 99 | 100 | 99 | 102 | 98 | 94 | 102 | 100 | 98 | 99 | 97 | 99 | 100 | 100 |
|----|----|----|----|----|----|----|----|----|----|----|----|----|----|
| 97 | 100 | 98 | 95 | 97 | 102 | 95 | 97 | 99 | 98 | 102 | 95 | 98 |
| 104 | 99 | 100 | 100 | 98 | 102 | 99 | 95 | 99 | 100 | 98 | 99 | 96 | 99 |
| 94 | 98 | 100 | 97 | 105 | 95 | 98 | 98 | 98 | 102 | 98 | 97 | 97 | 99 |

INTRA PREDICTION VALUES

| 98 | 99 | 98 | 98 | 99 | 98 | 99 | 98 | 97 | 98 | 94 | 97 | 99 | 97 |
|----|----|----|----|----|----|----|----|----|----|----|----|----|----|
| 98 | 99 | 99 | 98 | 99 | 98 | 99 | 98 | 97 | 98 | 94 | 97 | 99 | 97 |
| 98 | 99 | 99 | 98 | 99 | 98 | 99 | 98 | 97 | 98 | 94 | 97 | 99 | 97 |
| 98 | 99 | 99 | 98 | 99 | 98 | 99 | 98 | 97 | 98 | 94 | 97 | 99 | 97 |

INTRA PREDICTION RESIDUALS

| 1 | 1 | 0 | 4 | -1 | -4 | 3 | 2 | -1 | 3 | 4 | 2 | 1 | 3 |
|----|----|----|----|----|----|----|----|----|----|----|----|----|----|
| -1 | 1 | -1 | -3 | -2 | 4 | -4 | -1 | 0 | -1 | 4 | 3 | 1 | 1 |
| 6 | 0 | 1 | 2 | -1 | 4 | 0 | -3 | 0 | 2 | 6 | 5 | -3 | 2 |
| -4 | -1 | 1 | -1 | 6 | -3 | -1 | 0 | -1 | 0 | 4 | 2 | -2 | 2 |

ROOT MEAN SQUARE OF
INTRA PREDICTION RESIDUALS : 8.125

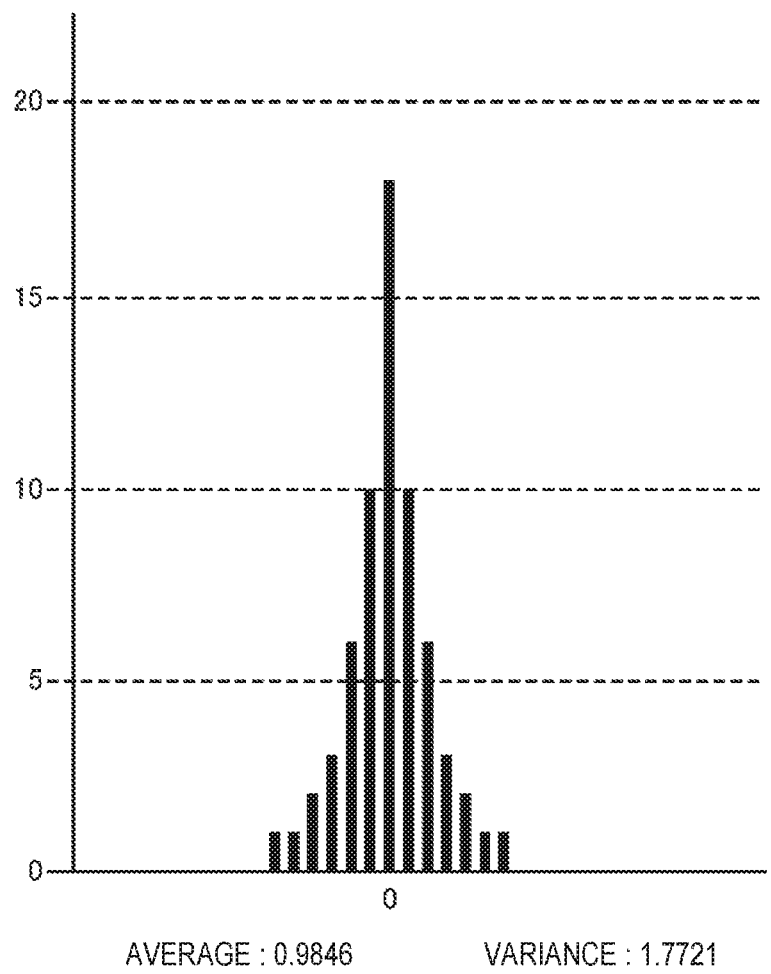

FIG. 8

FEATURE AMOUNTS OF RESPECTIVE PIXELS IN SEGMENT 1

| 98.76 | 98.48 | 98.76 | 98.6 | 98.68 | 98.44 | 98.32 | 97.96 | 97.76 | 97.44 | 97.44 | 97.8 | 98.56 | 99 | 98.96 | 98.76 |
|---|---|---|---|---|---|---|---|---|---|---|---|---|---|---|---|
| 98.44 | 98.6 | 98.32 | 98.56 | 98.56 | 98.48 | 98.32 | 98 | 97.44 | 97.24 | 97.2 | 97.76 | 98.68 | 99.12 | 98.8 | 98.52 |
| 98.44 | 98.2 | 98.6 | 98.56 | 98.56 | 98.48 | 98.36 | 97.92 | 97.48 | 96.92 | 97.2 | 97.88 | 98.6 | 99.16 | 98.96 | 98.48 |
| 97.96 | 98.6 | 98.64 | 98.56 | 98.56 | 98.48 | 98.36 | 97.92 | 97.48 | 96.92 | 97.2 | 97.88 | 98.6 | 99.12 | 98.88 | 98.36 |

DISTRIBUTION CLASSES ARE ALLOCATED TO RESPECTIVE PIXELS IN ACCORDANCE WITH SEQUENCING OF FEATURE AMOUNTS

| −1 | 1 | −1 | 0 | −1 | 1 | 1 | 0 | 3 | 3 | 3 | 2 | 0 | −3 | −2 | −2 |
|---|---|---|---|---|---|---|---|---|---|---|---|---|---|---|---|
| 1 | 0 | 1 | 1 | 1 | 1 | 2 | 1 | 4 | 4 | 6 | 3 | −1 | −2 | −1 | 1 |
| 1 | 1 | 0 | 1 | 0 | 1 | 2 | 2 | 3 | 7 | 5 | 2 | 0 | −4 | −3 | −1 |
| 2 | 0 | 0 | 0 | 0 | 1 | 2 | 2 | 3 | 5 | 4 | 2 | 0 | −5 | −1 | 1 |

PREDICTION VALUES ARE UPDATED IN ACCORDANCE WITH ALLOCATION (ADD ALLOCATED VALUES TO PREDICTION VALUES)

| 97 | 100 | 98 | 98 | 98 | 99 | 100 | 100 | 102 | 97 | 100 | 100 | 98 | 99 | 97 | 95 |
|---|---|---|---|---|---|---|---|---|---|---|---|---|---|---|---|
| 99 | 99 | 100 | 99 | 100 | 99 | 101 | 99 | 103 | 98 | 103 | 101 | 97 | 100 | 98 | 98 |
| 99 | 100 | 99 | 99 | 100 | 99 | 101 | 100 | 102 | 101 | 102 | 100 | 98 | 98 | 96 | 98 |
| 100 | 99 | 99 | 98 | 99 | 99 | 101 | 100 | 102 | 99 | 101 | 100 | 98 | 97 | 98 | 98 |

INTRA PREDICTION RESIDUALS BASED ON UPDATED PREDICTION VALUES

| 2 | 0 | 1 | 4 | 0 | −5 | 2 | 0 | −4 | 1 | −1 | −1 | −1 | 0 | 3 | 5 |
|---|---|---|---|---|---|---|---|---|---|---|---|---|---|---|---|
| −2 | 1 | −2 | −4 | −3 | 3 | −6 | −2 | −4 | 0 | −3 | −2 | 5 | −5 | −3 | 0 |
| 5 | −1 | 1 | 1 | −2 | 3 | −2 | −5 | −3 | −1 | 0 | 0 | 0 | 1 | 0 | 1 |
| −6 | −1 | 1 | −1 | 6 | −4 | −3 | −2 | −4 | −1 | −2 | −2 | 0 | 0 | −1 | 1 |

ROOT MEAN SQUARE OF INTRA PREDICTION RESIDUALS : 7.625

MOVING IMAGE CODING DEVICE, MOVING IMAGE DECODING DEVICE, MOVING IMAGE CODING METHOD AND MOVING IMAGE DECODING METHOD

This application is a continuation of International Patent Application No. PCT/JP2014/075639 filed on Sep. 26, 2014, and claims priority to Japanese Patent Application No. 2013-203965 filed on Sep. 30, 2013, the entire content of both of which is incorporated herein by reference.

BACKGROUND OF THE INVENTION

Field of the Invention

The present invention relates to moving image coding devices, moving image decoding devices, moving image coding methods and moving image decoding methods.

Description of the Related Art

In the standard methods related to video compression represented by Non-patent reference 1 and Non-patent reference 2, in in-screen prediction (intra prediction), a method is used in which a reference value, which is a decoded value of an adjacent coded block, is used as a prediction value for a pixel located at a position along a prediction direction. With this method, a plurality of prediction directions are defined in advance, and coding performance can be improved by applying an appropriate prediction direction.

Non-patent reference 3 and Non-patent reference 4 describe a method in which, in the aforementioned intra prediction, the reference value is weighted based on a pixel value of a neighboring decoded pixel, rather than using a simple copy of the reference value. Non-patent reference 5 describes a method of weighting a reference pixel based on a result of analysis that corresponds to the distance from the reference pixel.

Non-patent reference 1: "High Efficiency Video Coding (HEVC) text specification draft10," JCT-VC 12th meeting, JCTVC-L1003 v34, January 2013.
Non-patent reference 2: Joint Video Team (JVT) of ISO/IEC MPEG and ITU-T VCEG, "Text of ISO/IEC 14496-10 Advanced Video Coding,"
Non-patent reference 3: L. Wang, L.-M. Po, Y. Uddin, K.-M. Wong and S. Li, "A Novel Weighted Cross Prediction for H.264 Intra Coding," ICME2009.
Non-patent reference 4: S. Yu, Y. Gao, J. Chen and J. Zhou, "Distance-based Weighted prediction for H,264 Intra Coding," ICALIP2008.
Non-patent reference 5: R. Cha, O. C. Au, X. Fan, X. Zhang and J. Li, "Improved Combined Intra-Inter Prediction using Spatial-Variant Weighted Coefficient," ICME2011.

With the methods described in Non-patent references 1 and 2, when generating the prediction value based on the prediction direction in the intra prediction, the correlation of the pixel values among pixels decreases as the distance between the pixels increases. For this reason, if the block size of a processing block increases, prediction performance decreases the further the distance of a pixel from the reference pixel is.

Then, a reduction in the block size of the processing block is conceivable. This can prevent an increase in the distance between pixels, and accordingly a decrease in the prediction performance can be suppressed. However, a reduction in the block size of the processing block increases the number of blocks, resulting in an increase in control information to be provided to each processing block, and there is a concern that compression performance cannot be improved.

With the methods described in Non-patent references 3 and 4, as for a pixel whose distance from a coded pixel is small in a processing block, improvement in compression performance can be expected. However, as the distance from a coded pixel increases in the processing block, improvement in the compression performance cannot be expected.

Meanwhile, with the method described in Non-patent reference 5, as mentioned above, a reference pixel is weighted based on a result of analysis that corresponds to the distance from the reference pixel. For this reason, improvement in compression performance can be expected even if the distance from the reference pixel is large. However, the method described in Non-patent reference 5 uses information of an inter coding frame when performing the aforementioned analysis. For this reason, improvement in compression performance cannot be expected in the intra prediction.

SUMMARY OF THE INVENTION

According to an aspect of the present invention, a moving image coding device that permits generation of an intra prediction value that is based on an intra prediction direction, includes: a prediction error statistic evaluation unit configured to express, as a parameter, a statistic of a prediction error that is based on the intra prediction direction, and approximate the parameter of the statistic in accordance with a distance from a reference pixel located along the intra prediction direction to a pixel to be processed; a prediction value feature amount calculation unit configured to calculate, for a pixel near the pixel to be processed, a feature amount of a prediction value that is based on the intra prediction direction; and a prediction value calculation unit configured to estimate a prediction error corresponding to the distance from the reference pixel located along the intra prediction direction to the pixel to be processed using the parameter of the statistic approximated by the prediction error statistic evaluation unit, reflect the prediction error in the prediction value that is based on the intra prediction direction using the feature amount calculated by the prediction value feature amount calculation unit, and generate a new prediction value.

Further features of the present invention will become apparent from the following description of exemplary embodiments (with reference to the attached drawings).

BRIEF DESCRIPTION OF DRAWINGS

FIG. 5 is a diagram for illustrating operations of the intra prediction value generation unit included in the moving image coding device according to the aforementioned embodiment;

FIG. 7 is a diagram for illustrating operations of the intra prediction value generation unit included in the moving image coding device according to the aforementioned embodiment;

FIG. 8 is a diagram for illustrating operations of the intra prediction value generation unit included in the moving image coding device according to the aforementioned embodiment;

DESCRIPTION OF THE EMBODIMENTS

Hereinafter, embodiments of the present invention will be described with reference to the drawings. Note that constituent elements in the following embodiments can be replaced with existing constituent elements or the like as appropriate, and various variations including combinations with other existing constituent elements are possible. Accordingly, the descriptions of the following embodiments do not limit the content of the invention stated in the claims.

First Embodiment

[Configuration and Operations of Moving Image Coding Device AA]

Figure 1:
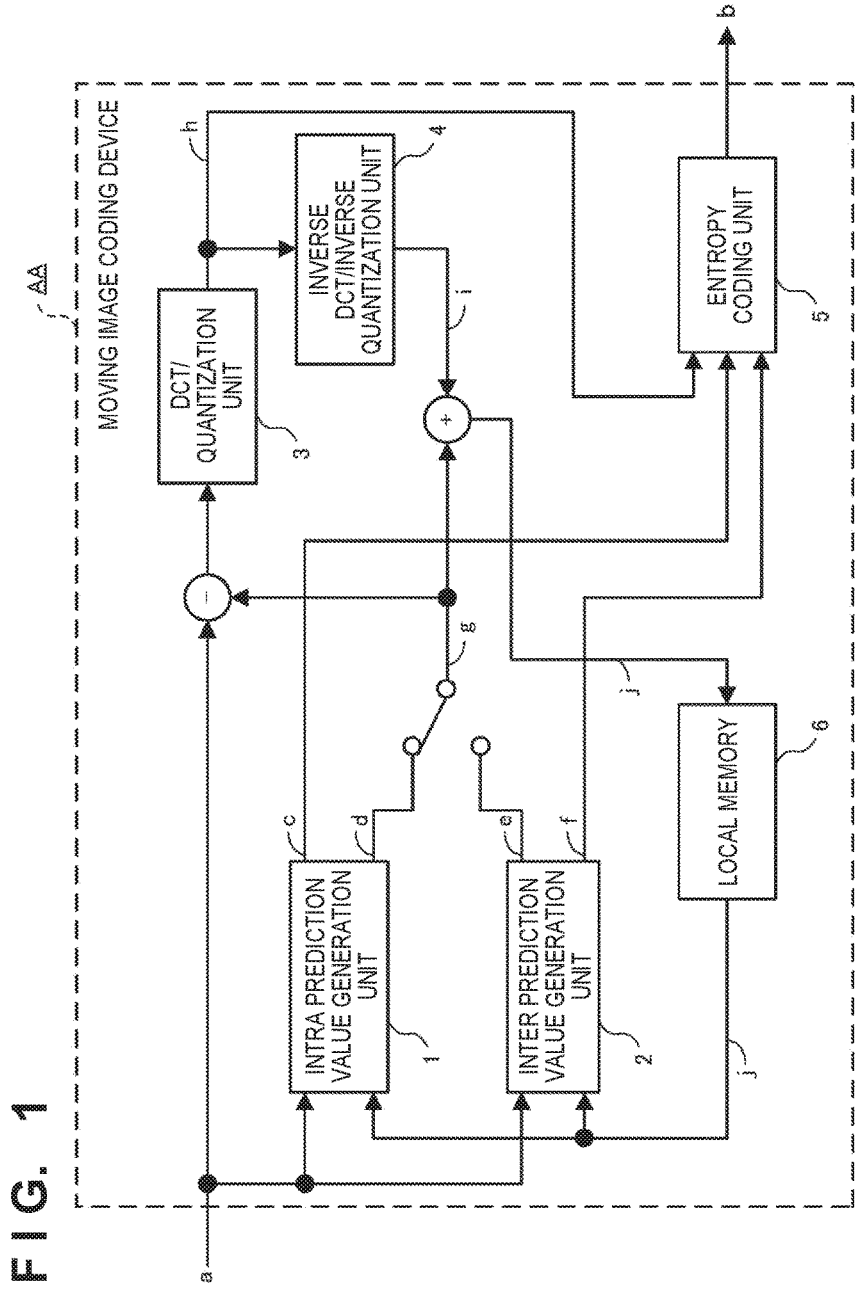
FIG. 1 is a block diagram of a moving image coding device according to a first embodiment of the present invention.

FIG. 1 is a block diagram of a moving image coding device AA according to a first embodiment of the present invention. The moving image coding device AA includes an intra prediction value generation unit 1, an inter prediction value generation unit 2, a DCT/quantization unit 3, an inverse DCT/inverse quantization unit 4, an entropy coding unit 5, and a local memory 6.

An input image a and a later-described coded image j that is supplied from the local memory 6 are input to the intra prediction value generation unit 1. This intra prediction value generation unit 1 generates a prediction value based on intra prediction and outputs this prediction value as an intra prediction value d, and also outputs control information (such as an intra prediction direction) c regarding the intra prediction.

The input image a and the later-described coded image j that is supplied from the local memory 6 are input to the inter prediction value generation unit 2. This inter prediction value generation unit 2 generates a prediction value based on inter prediction, outputs this prediction value as an inter prediction value e, and also outputs control information (such as a motion vector) f regarding the inter prediction.

A prediction residual signal is input to the DCT/quantization unit 3. The prediction residual signal is a difference signal between the input image a and a prediction value g, and the prediction value g is one of the intra prediction value d and the inter prediction value e that is obtained by a prediction method expected to achieve higher coding performance. This DCT/quantization unit 3 performs orthogonal transform processing on the prediction residual signal, performs quantization processing on a transform coefficient obtained by this orthogonal transform processing, and outputs a quantized transform coefficient h.

The quantized transform coefficient h is input to the inverse DCT/inverse quantization unit 4. This inverse DCT/inverse quantization unit 4 performs inverse quantization processing on the quantized transform coefficient h, performs inverse transform processing on a transform coefficient obtained by this inverse quantization processing, and outputs an inverse orthogonal-transformed transform coefficient i.

The control information c regarding the intra prediction, the control information f regarding the inter prediction, and the quantized transform coefficient h are input to the entropy coding unit 5. This entropy coding unit 5 performs entropy coding processing on the above input information, describes a result thereof in coded data in accordance with a rule (coding syntax) of description in coded data, and outputs this data as coded data b.

The coded image j is input to the local memory 6. This local memory 6 accumulates the input coded image j, and supplies the coded image j to the intra prediction value generation unit 1 and the inter prediction value generation unit 2 as appropriate in the case where a past coded image j needs to be referenced for the next and subsequent coding processing unit blocks. The coded image j refers to a signal obtained by adding the prediction value g and the inverse orthogonal-transformed transform coefficient i.

(Configuration and Operations of Intra Prediction Value Generation Unit 1)

Figure 2:
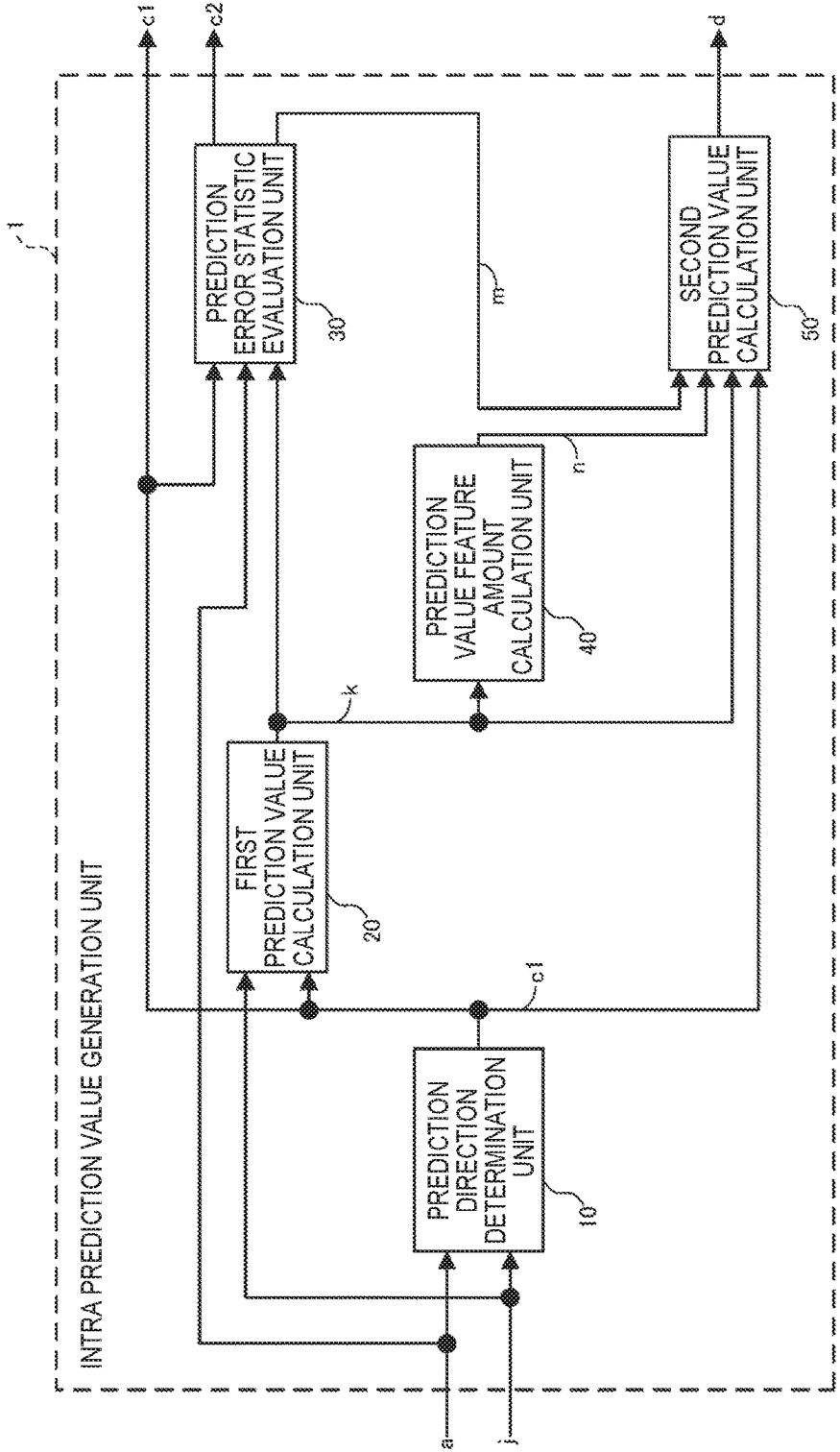
FIG. 2 is a block diagram of an intra prediction value generation unit included in the moving image coding device according to the aforementioned embodiment.

FIG. 2 is a block diagram of the intra prediction value generation unit 1. The intra prediction value generation unit 1 includes a prediction direction determination unit 10, a first prediction value calculation unit 20, a prediction error statistic evaluation unit 30, a prediction value feature amount calculation unit 40, and a second prediction value calculation unit 50.

The input image a and the coded image j are input to the prediction direction determination unit 10. This prediction direction determination unit 10 determines a prediction direction in which prediction can be most appropriately performed with respect to the input image a and the coded image j from among a plurality of predetermined intra prediction directions, and outputs the determined prediction direction as an intra prediction direction c1.

The coded image j and an intra prediction direction c1 are input to the first prediction value calculation unit 20. This first prediction value calculation unit 20 references a pixel value of the coded image j and calculates and outputs an intra prediction value k in accordance with the intra prediction direction c1.

The input image a, the intra prediction direction c1, and the intra prediction value k are input to the prediction error statistic evaluation unit 30. This prediction error statistic evaluation unit 30 initially obtains an intra prediction residual from the input image a and the intra prediction value k, evaluates a statistic regarding the obtained intra prediction residual, and parametrically expresses this statistic. Next, the prediction error statistic evaluation unit 30 obtains an approximation function expressing the relationship between the statistic parameter and the distance from a reference pixel located along the intra prediction direction c1, and obtains and outputs a parameter approximation coefficient c2 based on a coefficient of the approximation function. The parameter approximation coefficient c2 and the intra prediction direction c1 are output as the aforementioned control information c regarding the intra prediction from the intra prediction value generation unit 1. Next, the prediction error statistic evaluation unit 30 outputs a statistic obtained from the obtained approximation coefficient as a statistic m. The above-described prediction error statistic evaluation unit 30 will be described below in detail using FIG. 3.

(Configuration and Operations of Prediction Error Statistic Evaluation Unit 30)

Figure 3:
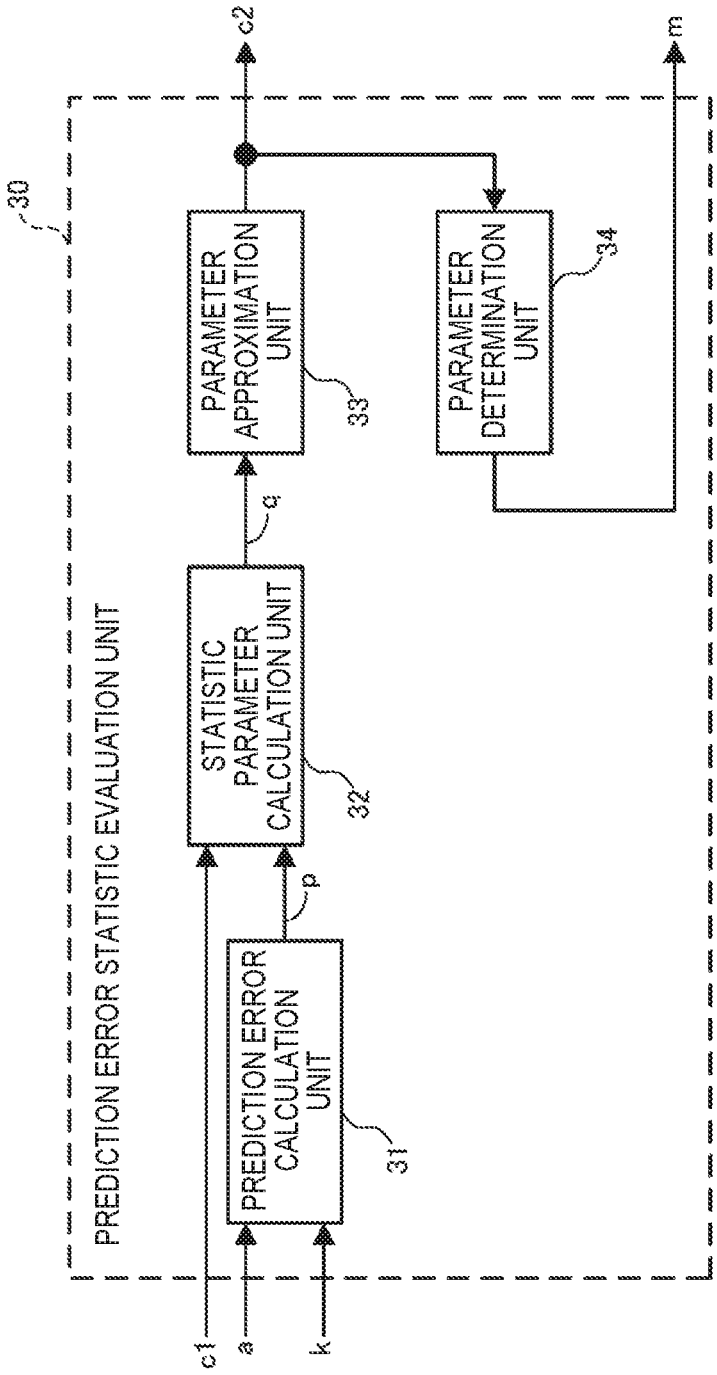
FIG. 3 is a block diagram of a prediction error statistic evaluation unit provided in the intra prediction value generation unit included in the moving image coding device according to the aforementioned embodiment.

FIG. 3 is a block diagram of the prediction error statistic evaluation unit 30. The prediction error statistic evaluation unit 30 includes a prediction error calculation unit 31, a statistic parameter calculation unit 32, a parameter approximation unit 33, and a parameter determination unit 34.

The input image a and the intra prediction value k are input to the prediction error calculation unit 31. This prediction error calculation unit 31 calculates, for each pixel, a differential value between the input image a and the intra prediction value k, and outputs the calculated differential value as an intra prediction error p.

The intra prediction direction c1 and the intra prediction error p are input to the statistic parameter calculation unit 32. This statistic parameter calculation unit 32 initially calculates, for each pixel in the processing block, the distance to the pixel from the reference pixel located along the intra prediction direction c1. Next, the statistic parameter calculation unit 32 classifies each pixel in the processing block into T kinds (T is an integer that is no smaller than 2) of segments in accordance with the calculated distance, and generates a histogram expressing the occurrence frequency of the intra prediction error for each segment. Next, the statistic parameter calculation unit 32 expresses the generated histogram as a distribution, and in the present embodiment, a Laplace distribution is applied as this distribution. Next, the statistic parameter calculation unit 32 calculates an average and a variance in each segment, and outputs the calculated average and variance as statistic parameters q in each segment.

The statistic parameters q in each segment are input to the parameter approximation unit 33. This parameter approximation unit 33 initially approximates, for each of the statistic parameters q (the average and the variance in the present embodiment) in each segment, the relationship between the distance from the reference pixel and the statistic parameter by means of linear approximation or polynomial approximation. Next, the parameter approximation unit 33 quantizes a coefficient of the obtained approximation function in accordance with a predetermined quantization step width, and outputs the quantized coefficient as a parameter approximation coefficient c2.

The parameter approximation coefficient c2 is input to the parameter determination unit 34. This parameter determination unit 34 initially inversely quantizes the parameter approximation coefficient c2 in accordance with the predetermined quantization step width, and derives an approximation function for each type of statistic parameter (the average and the variance in the present embodiment) using the obtained approximation coefficient. Next, the parameter determination unit 34 obtains an estimated value of the statistic parameter in accordance with the distance from the reference pixel using the derived approximation function, and outputs the obtained estimated value as the statistic m.

Returning to FIG. 2, the intra prediction value k is input to the prediction value feature amount calculation unit 40. This prediction value feature amount calculation unit 40 calculates a feature amount regarding the intra prediction value k with respect to every pixel in the processing block, and outputs the calculated feature amount as a feature amount n.

Specifically, the prediction value feature amount calculation unit 40 initially calculates, with respect to each pixel in the processing block, a feature amount that is based on prediction values of pixels corresponding to a rhombus tap with the pixel to be processed as the center, and outputs the calculated feature amount as the feature amount n. The following two types can be taken as examples of the feature amount to be calculated, for example. The first one is a result of averaging prediction values of target pixels within a region corresponding to the tap. The second one is a result of multiplying the average value of the prediction values of the pixels corresponding to the tap by a weighting coefficient corresponding to the distance from the reference pixel.

The intra prediction direction c1, the intra prediction value k, the statistic m, and the feature amount n are input to the second prediction value calculation unit 50. This second prediction value calculation unit 50 initially obtains the distance from the reference pixel located along the intra prediction direction c1 based on the intra prediction direction c1 and the statistic m. Next, the second prediction value calculation unit 50 calculates a statistic of an estimated prediction error based on the distance from the reference pixel located along the intra prediction direction, reflects the calculated prediction error statistic in the intra prediction value k, generates a new intra prediction value, and outputs the generated intra prediction value as the intra prediction value d.

Specifically, the second prediction value calculation unit 50 initially classifies the processing block into T kinds of segments in accordance with the distance from the reference pixel located along the intra prediction direction c1 based on the intra prediction direction c1 and the statistic m, and generates a histogram related to the prediction error for each segment based on the statistic m for each distance from the reference pixel. Here, the magnitudes of feature amounts in the same segment are compared based on the feature amount n, and larger feature amounts are sequentially associated with pixels whose class (prediction error) in the histogram is higher. Next, all pixels in the processing block are associated with the prediction error distribution, the prediction error distribution corresponding to each pixel is added to the intra prediction value k, and a result thereof is used as the intra prediction value d.

(Prediction Value Generation by Intra Prediction Value Generation Unit 1)

Prediction value generation by the intra prediction value generation unit 1 will be described below using FIGS. 4 to 8.

The intra prediction value generation unit 1 initially determines the intra prediction direction for the processing block using the prediction direction determination unit 10, and calculates the intra prediction value using the first prediction value calculation unit 20. It is assumed below that the intra prediction direction for the processing block has been determined to be a vertical direction.

Figure 4:
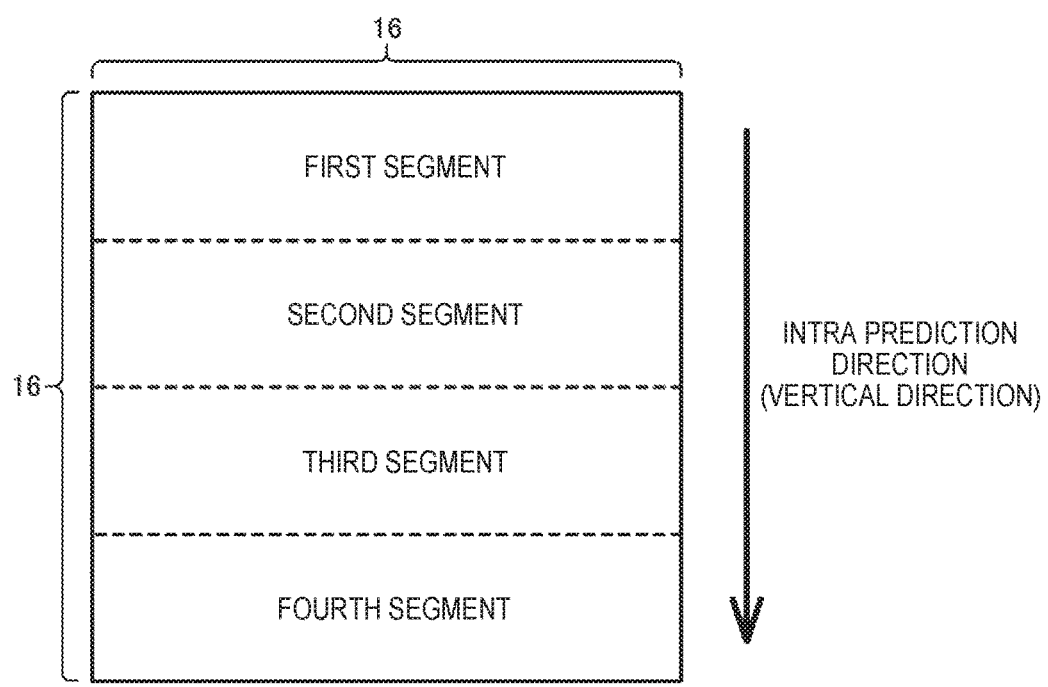
FIG. 4 is a diagram for illustrating operations of the intra prediction value generation unit included in the moving image coding device according to the aforementioned embodiment.

FIG. 4 is a diagram showing the processing block. The block size of the processing block is 16×16. The intra prediction value generation unit 1 initially classifies the processing block into four types of segments in a direction perpendicular to the intra prediction direction in accordance with the distance from the reference pixel to each pixel, using the statistic parameter calculation unit 32.

Next, the intra prediction value generation unit 1 calculates a differential value between the input image and the intra prediction value for each pixel and obtains the intra prediction residual as shown in FIG. 5, using the prediction error calculation unit 31. FIG. 5 shows the pixel values of the input image, the intra prediction values, and the intra prediction residuals in a first segment shown in FIG. 4. Note that the following description describes the case where prediction value generation by the intra prediction value generation unit 1 is performed for the first segment.

Figure 6:
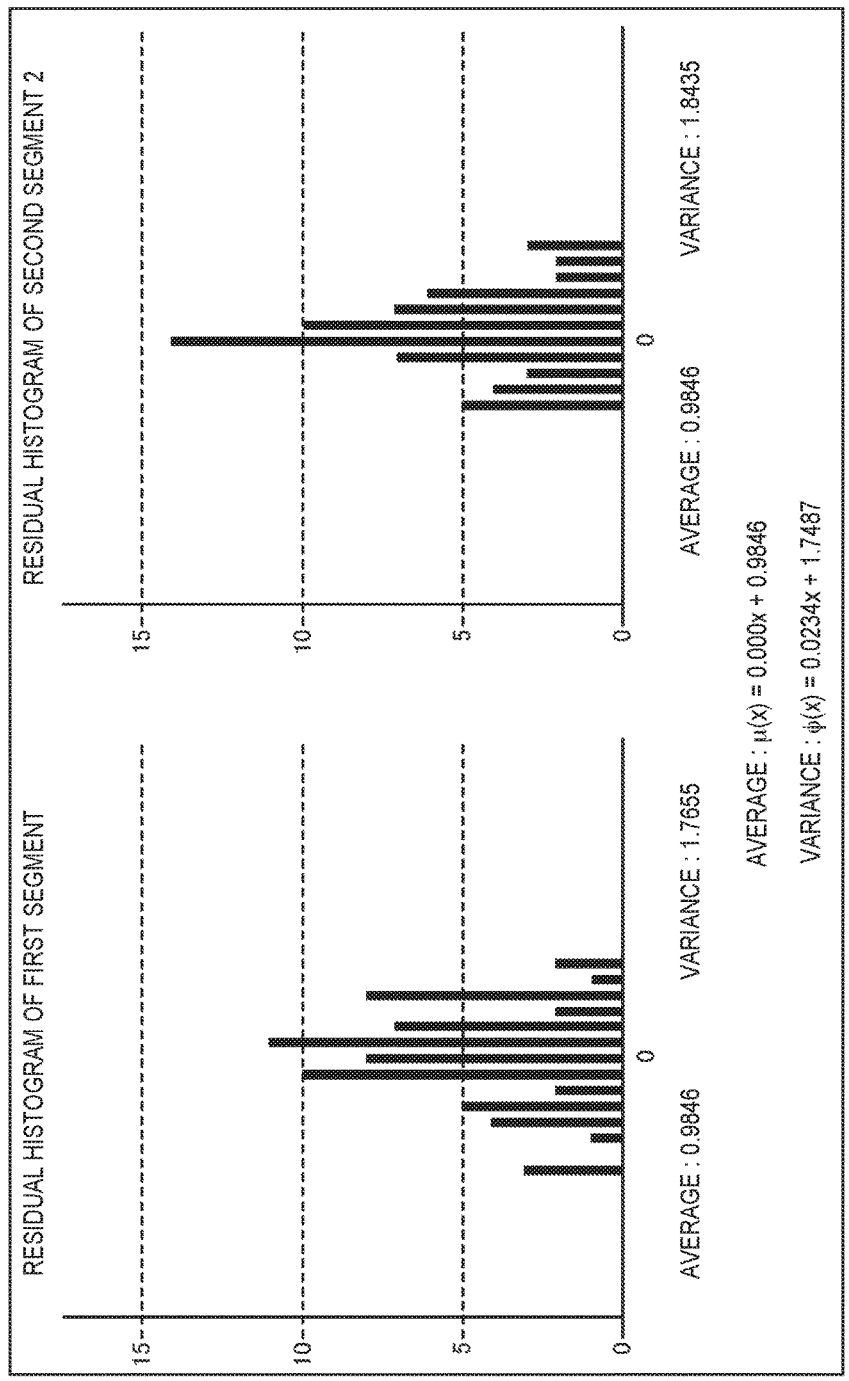
FIG. 6 is a diagram for illustrating operations of the intra prediction value generation unit included in the moving image coding device according to the aforementioned embodiment.

Next, the intra prediction value generation unit 1 generates a histogram of intra prediction errors for each segment, and obtains an average μ and a distribution φ of the intra prediction residuals in each segment, using the statistic parameter calculation unit 32. FIG. 6 shows the histograms of the intra prediction residuals, the averages, and the distributions in the first segment and a second segment.

Next, with segment numbers "1", "2", "3", and "4" assigned respectively to the first segment, the second segment, a third segment, and a fourth segment, the intra prediction value generation unit 1 approximates the averages μ and the distributions φ by means of linear approximation with the segment number as a variable x, using the parameter approximation unit 33. Then, as shown in FIG. 6, a linear approximation function for the average μ and a linear approximation function for the distribution φ are obtained.

Next, the intra prediction value generation unit 1 quantizes coefficients (0.000 and 0.9846) of the linear approximation function for the average μ and coefficients (0.0234 and 1.7487) of the linear approximation function for the distribution φ using the parameter approximation unit 33. A result of the quantization (the parameter approximation coefficient c2) is coded by the entropy coding unit 5 and transmitted to a later-described moving image decoding device BB.

Next, the intra prediction value generation unit 1 inversely quantizes the result of the quantization performed by the parameter approximation unit 33 using the parameter determination unit 34, derives the approximation function for the average μ and the approximation function for the distribution φ, and calculates estimated values of the average μ and the distribution φ using the derived approximation functions. Then, as shown in FIG. 7, 0.9846 is obtained as the estimated value of the average μ, and 1.7721 is obtained as the estimated value of the distribution φ. FIG. 7 shows the estimated values of the average μ and the distribution φ calculated using the approximation function, and a Laplace distribution graph calculated from these estimated values.

Next, the intra prediction value generation unit 1 calculates a feature amount using the prediction value feature amount calculation unit 40. The calculation of the feature amount uses an intra prediction value for a pixel in the processing block, a decoded pixel value for a coded pixel outside the processing block, and a value obtained by extrapolating the intra prediction value for a pixel that is outside the processing block and has not been coded. A filter with which all taps are equally weighted is used for the diamond-shaped taps each constituted by 7×7 pixels with a pixel whose feature amount is to be calculated as the center.

Next, the intra prediction value generation unit 1 calculates a prediction error statistic such that the histogram in each segment coincides with the Laplace distribution calculated from the estimated values of the average μ and the distribution φ, using the second prediction value calculation unit 50. Also, pixels are allocated to prediction error statistics such that a pixel with a smaller feature amount is given a larger prediction error statistic. Then, the allocated prediction error statistic is added to the intra prediction value k for each pixel, and the intra prediction value d is obtained.

The aforementioned allocation will be described below using FIG. 8. In the first segment, the frequency of the smallest class "−5" is 1, the frequency of the class "−4" is 1, and the frequency of the class "−3" is 2. For this reason, in the first segment, the number of pixels having the prediction error statistics "−5", "−4", and "−3" are set respectively to 1, 1, and 2. Specifically, the prediction error statistics "−5", "−4", and "−3" are allocated respectively to the pixel having the smallest feature amount in the first segment, the pixel having the second smallest feature amount, and the pixels having the third and fourth smallest feature amounts.

Note that in FIGS. 4 to 8, the intra prediction direction for the processing block is set to a vertical direction, and accordingly the number of pixels included respectively in the first to fourth segments are the same, whereas in the case where the intra prediction direction for the processing block is set to an oblique direction, for example, the number of pixels to be included in the respective segments are different. However, even if the number of pixels included in the respective segments are different, there is no particular problem since prediction value generation in the segments is performed independently for each segment using the statistics (the average μ and the distribution φ) related to the intra prediction residual of each segment.

[Configuration and Operations of Moving Image Decoding Device BB]

Figure 9:
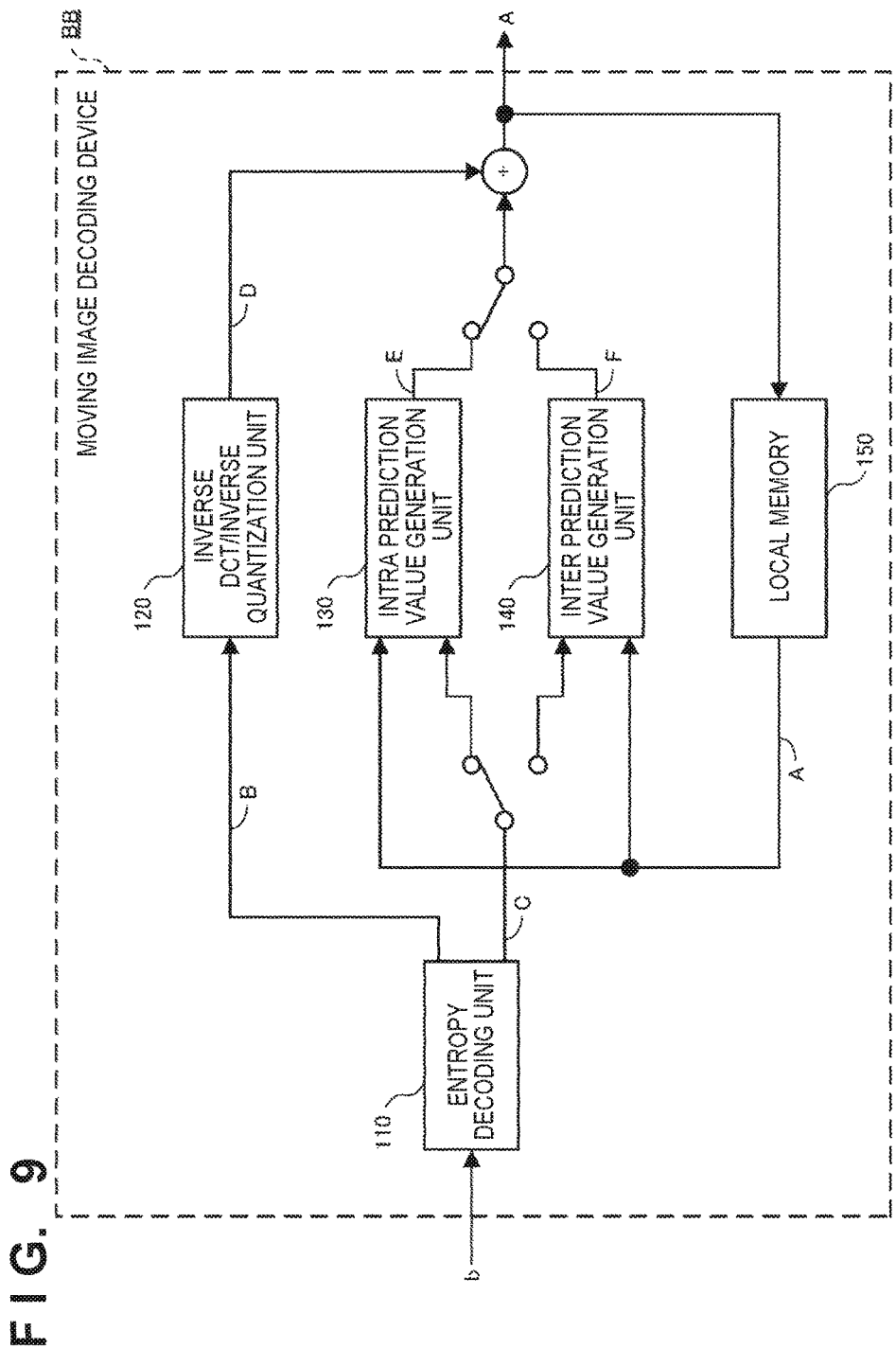
FIG. 9 is a block diagram of a moving image decoding device according to the first embodiment of the present invention.

FIG. 9 is a block diagram of a moving image decoding device BB according to the first embodiment of the present invention. The moving image decoding device BB includes an entropy decoding unit 110, an inverse DCT/inverse quantization unit 120, an intra prediction value generation unit 130, an inter prediction value generation unit 140, and a local memory 150.

The coded data b is input to the entropy decoding unit 110. This entropy decoding unit 110 analyzes the content described in the coded data b in accordance with a coded data structure, performs entropy decoding, and acquires and outputs a residual signal B and control information C for inter prediction or intra prediction.

The residual signal B is input to the inverse DCT/inverse quantization unit 120. This inverse DCT/inverse quantization unit 120 performs inverse quantization processing on the residual signal B, performs inverse transform processing on a result of the inverse quantization processing, and outputs a result of the inverse transform processing as an inverse orthogonal transform result D.

A later-described decoded image A that is supplied from the local memory 150 and the control information C for prediction are input to the intra prediction value generation unit 130. This intra prediction value generation unit 130 obtains the intra prediction direction based on the control information C for prediction, references the pixel value of the decoded image A in accordance with the obtained intra prediction direction, and generates and outputs an intra prediction value E.

The later-described decoded image A that is supplied from the local memory 150 and the control information C for prediction are input to the inter prediction value generation unit 140. This inter prediction value generation unit 140 obtains a motion vector based on the control information for prediction, references the pixel value of the decoded image A in accordance with the obtained motion vector, and generates and outputs an inter prediction value F.

The decoded image A is input to the local memory 150. This local memory 150 accumulates the input decoded image A, and supplies the accumulated decoded image A to the intra prediction value generation unit 130 and the inter prediction value generation unit 140 as appropriate in the case where a past decoded image A needs to be referenced for the next and subsequent decoding processing unit blocks. The decoded image A refers to a signal obtained by adding the inverse orthogonal transform result D and the intra prediction value E or the inter prediction value F.

(Configuration and Operations of Intra Prediction Value Generation Unit 130)

Figure 10:
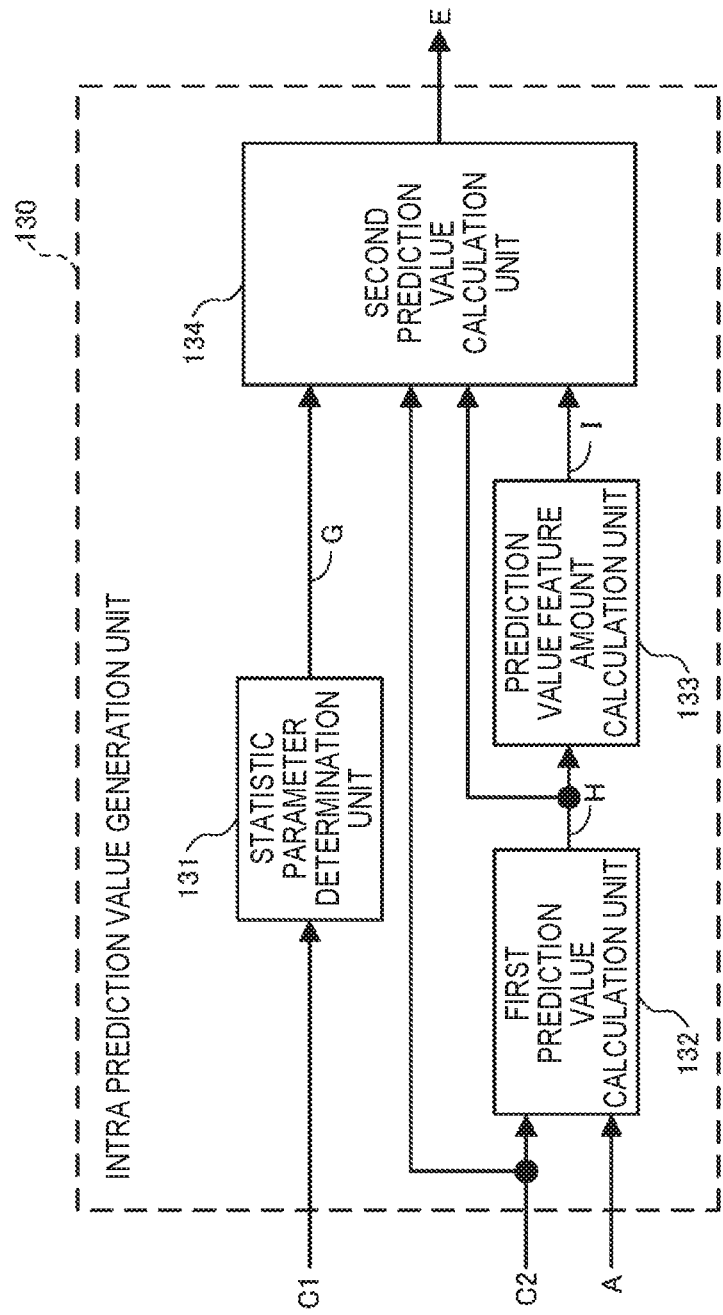
FIG. 10 is a block diagram of an intra prediction value generation unit included in the moving image decoding device according to the aforementioned embodiment.

FIG. 10 is a block diagram of the intra prediction value generation unit 130. The intra prediction value generation unit 130 includes a statistic parameter determination unit 131, a first prediction value calculation unit 132, a prediction value feature amount calculation unit 133, and a second prediction value calculation unit 134.

A quantized approximation coefficient C1 is input to the statistic parameter determination unit 131. The quantized approximation coefficient C1 is information included in the control information C for prediction. This statistic parameter determination unit 131 initially inversely quantizes the quantized approximation coefficient C1 in accordance with a predetermined quantization step, and derives an approximation function for each type of statistic parameter (the average and the variance). Next, the statistic parameter determination unit 131 obtains a statistic parameter corresponding to the distance from the reference pixel using the obtained approximation function, and outputs the obtained statistic parameter as a statistic G.

The decoded image A and an intra prediction direction C2 are input to the first prediction value calculation unit 132. The intra prediction direction C2 is information included in the control information C for prediction. This first prediction value calculation unit 132 references a pixel value of the decoded image A in accordance with the intra prediction direction C2, and generates and outputs an intra prediction value H in the processing block.

The intra prediction value H is input to the prediction value feature amount calculation unit 133. This prediction value feature amount calculation unit 133 calculates a feature amount that is based on prediction values of pixels corresponding to a rhombus tap with the pixel to be processed as the center for each pixel in the processing block, and outputs the calculated feature amount as a feature amount I. The following two types can be taken as examples of the feature amount to be calculated, for example. The first one is a result of averaging prediction values of target pixels within a region corresponding to the tap. The second one is a result of multiplying the average value of the prediction values of the pixels corresponding to the tap by a weighting coefficient corresponding to the distance from the reference pixel.

The intra prediction direction C2, the statistic G, the intra prediction value H, and the feature amount I are input to the second prediction value calculation unit 134. This second prediction value calculation unit 134 initially calculates, for each pixel in the processing block, the distance to the pixel from the reference pixel located along the intra prediction direction C2. Next, the second prediction value calculation unit 134 classifies each pixel in the processing block into T kinds of segments in accordance with the calculated distance, and generates a histogram expressing the occurrence frequency of the intra prediction error for each segment. Here, the magnitudes of the feature amounts in the same segments are compared based on the feature amount I, and larger feature amounts are sequentially associated with pixels whose class (prediction error) in the histogram is higher. Next, all pixels in the processing block are associated with the prediction error distribution, the prediction error distribution corresponding to each pixel is added to the intra prediction value H, and a result thereof is used as the intra prediction value E.

With the above-described moving image coding device AA and moving image decoding device BB, the following effect can be achieved.

The moving image coding device AA and the moving image decoding device BB each express, as a statistic, the occurrence frequency of a change in the pixel value for each distance from a reference pixel located along the intra prediction direction, and correct a prediction value that is based on the intra prediction direction using this statistic. For this reason, the change in the pixel value, in which pixel value correlation among pixels in the processing block is considered, can be reflected in the prediction value that is based on the intra prediction direction.

In addition, the control information necessary for expressing a new generated prediction value is only the average $\mu$ and the distribution $\varphi$. For this reason, an increase in the control information to be provided to each processing block can be suppressed.

With the above-described configuration, in the intra prediction, the bit rate can be suppressed without decreasing video quality, and accordingly, compression performance can be improved.

The moving image coding device AA and the moving image decoding device BB each can use a Laplace distribution expression with respect to a histogram of the prediction error as a statistic, and use an average and a variance of the Laplace distribution as parameters of the statistic.

The moving image coding device AA and the moving image decoding device BB each determine, based on the magnitude of the feature amount, a pixel for reflecting the prediction error in the prediction value thereof from among the pixels in the processing block. For this reason, the change in the pixel value, in which pixel value correlation among the pixels in the processing block is considered, can be reflected in the prediction value of an appropriate pixel.

The moving image coding device AA and the moving image decoding device BB each add the prediction error to the prediction value that is based on the intra prediction direction, and generate new prediction values. For this reason, a new prediction value can be generated with an easy operation.

The moving image coding device AA and the moving image decoding device BB each can use, regarding prediction values of pixels corresponding to a diamond-shaped tap with a pixel whose feature amount is to be calculated as the center, an average value of the prediction values of the respective pixels in this tap as the feature amount, and use a value obtained by multiplying the average value of the prediction values of the pixels in the diamond-shaped tap with the pixel whose feature amount is to be calculated as the center by a coefficient corresponding to the distance from a reference pixel to the pixel whose feature amount is to be calculated as the feature amount.

Second Embodiment

[Configuration and Operations of Moving Image Coding Device CC]

A moving image coding device CC according to a second embodiment of the present invention will be described below. The moving image coding device CC is different from the moving image coding device AA according to the first embodiment of the present invention shown in FIG. 1 in that an intra prediction value generation unit 1A is provided in place of the intra prediction value generation unit 1. Note that the same constituent elements of the moving image coding device CC as those of the moving image coding device AA will be assigned the same signs, and descriptions thereof will be omitted.

(Configuration and Operations of Intra Prediction Value Generation Unit 1A)

Figure 11:
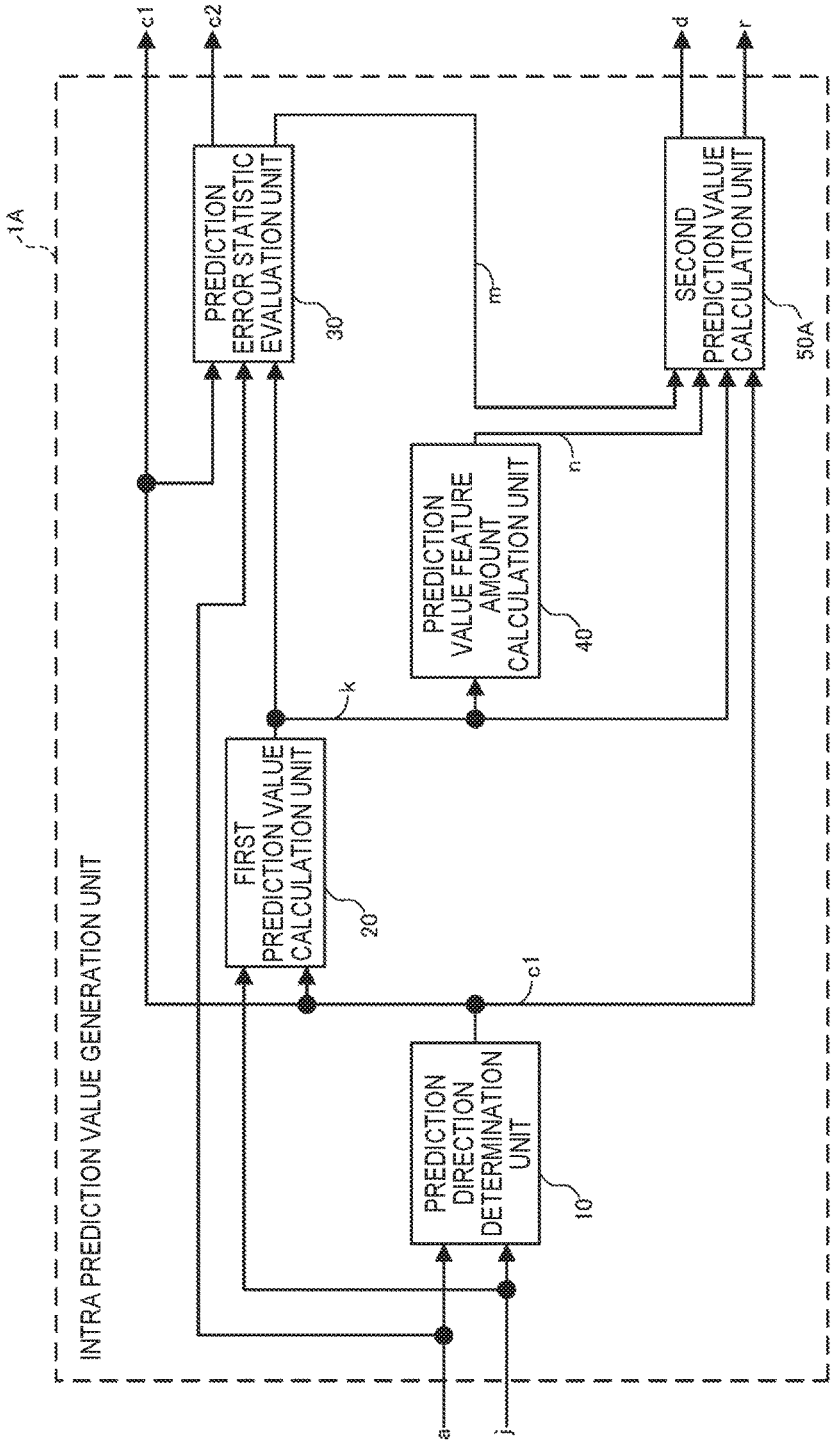
FIG. 11 is a block diagram of an intra prediction value generation unit included in a moving image coding device according to a second embodiment of the present invention.

FIG. 11 is a block diagram of the intra prediction value generation unit 1A. The intra prediction value generation unit 1A is different from the intra prediction value generation unit 1 according to the first embodiment of the present invention shown in FIG. 2 in that a second prediction value calculation unit 50A is provided in place of the second prediction value calculation unit 50.

The intra prediction direction c1, the intra prediction value k, the statistic m, and the feature amount n are input to the second prediction value calculation unit 50A. This second prediction value calculation unit 50A initially obtains the distance from a reference pixel located along the intra prediction direction based on the intra prediction direction c1 and the statistic m. Next, the second prediction value calculation unit 50 calculates a statistic of an estimated prediction error based on the distance from the reference pixel located along the intra prediction direction, reflects the calculated prediction error statistic in the intra prediction value k, generates a new intra prediction value, and outputs the generated intra prediction value as the intra prediction value d. Also, the second prediction value calculation unit 50A outputs predetermined information for generating the intra prediction value d as sequence identification information c3.

Specifically, the second prediction value calculation unit 50A initially classifies the processing block into T kinds of segments in accordance with the distance from the reference pixel located along the intra prediction direction c1 based on the intra prediction direction c1 and the statistic m, and generates a histogram related to the prediction error for each segment based on the statistic m for each distance from the reference pixel. Here, the magnitudes of the feature amounts are compared in the same segment based on the feature amount n, the most appropriate rule is determined from among a plurality of predetermined rules between the moving image coding device CC and a later-described moving image decoding device DD, and a histogram class (prediction error) is allocated to each pixel in accordance with the determined rule. Information indicating the rule used in this allocation is output as the sequence identification information c3. Next, all pixels in the processing block are associated with the prediction error distribution, the prediction error distribution corresponding to each pixel is added to the intra prediction value k, and a result thereof is used as the intra prediction value d.

Note that in each of the aforementioned plurality of predetermined rules, a rule that provides a way to associate the magnitude of the feature amount with the histogram class is defined. It is assumed that, for example, the aforementioned plurality of rules include a rule for allocating a high histogram class to a pixel having a large feature amount, a rule for allocating a high histogram class to a pixel having a small feature amount, and the like. Then, the second prediction value calculation unit 50A selects one of the plurality of rules that is most appropriate for coding performance for each processing block.

Also, the sequence identification information c3 is output as the aforementioned control information c regarding the intra prediction from the intra prediction value generation unit 1A together with the parameter approximation coefficient c2 and the intra prediction direction c1.

[Configuration and Operations of Moving Image Decoding Device DD]

The moving image decoding device DD according to the second embodiment of the present invention will be described below. The moving image decoding device DD is different from the moving image decoding device BB according to the first embodiment of the present invention shown in FIG. 9 in that an intra prediction value generation unit 130A is provided in place of the intra prediction value generation unit 130. Note that the same constituent elements of the moving image decoding device DD as those of the moving image decoding device BB are assigned the same signs, and descriptions thereof will be omitted.

(Configuration and Operations of Intra Prediction Value Generation Unit 130A)

Figure 12:
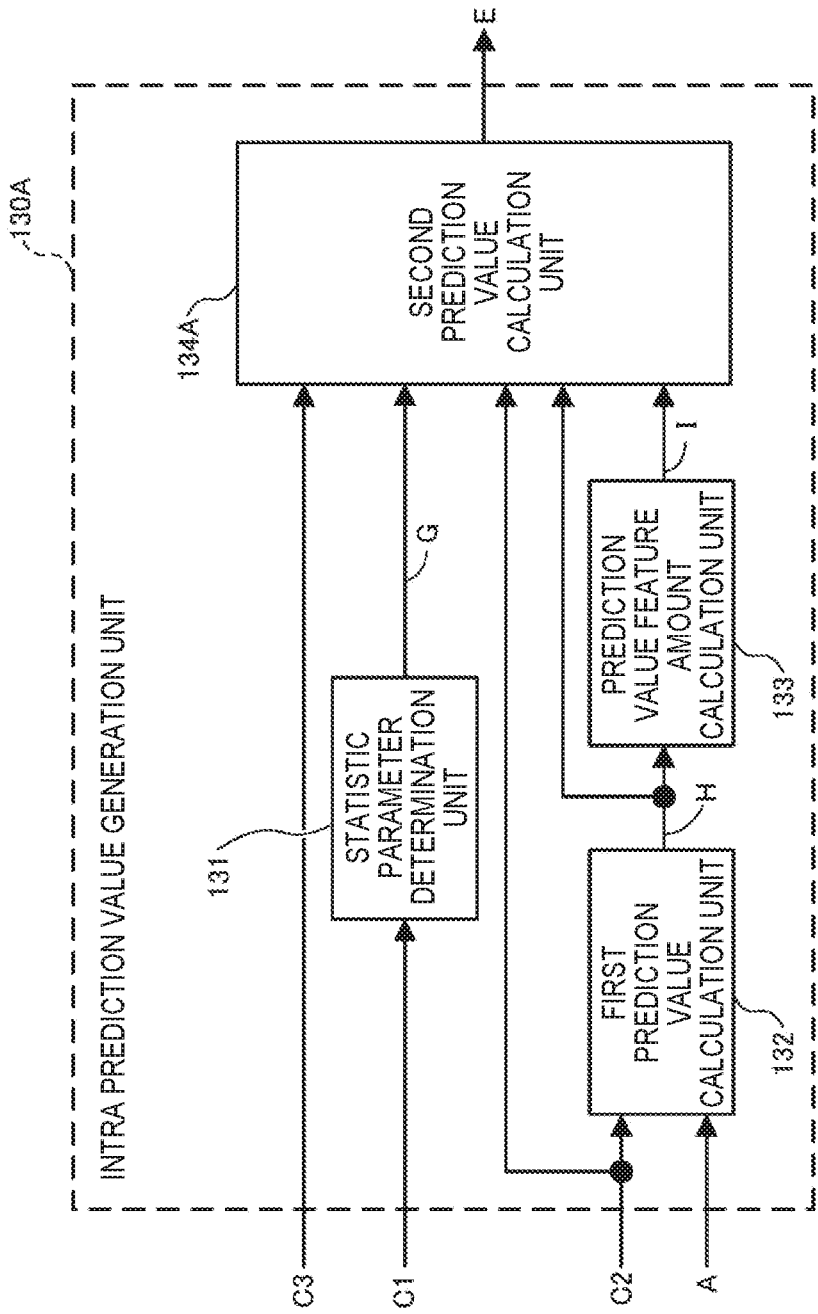
FIG. 12 is a block diagram of the intra prediction value generation unit included in a moving image decoding device according to the second embodiment of the present invention.

FIG. 12 is a block diagram of the intra prediction value generation unit 130A. The intra prediction value generation unit 130A is different from the intra prediction value generation unit 130 according to the first embodiment of the present invention shown in FIG. 10 in that a second prediction value calculation unit 134A is provided in place of the second prediction value calculation unit 134.

The intra prediction direction C2, the sequence identification information C3, the statistic G, the intra prediction value H, and a feature amount I are input to the second prediction value calculation unit 134A. The sequence identification information C3 is information included in the control information C for prediction. This second prediction value calculation unit 134A initially calculates, for each pixel in the processing block, the distance to the pixel from the reference pixel located along the intra prediction direction. Next, the second prediction value calculation unit 134A classifies each pixel in the processing block into T kinds of segments in accordance with the calculated distance, and generates a histogram expressing the occurrence frequency of the intra prediction error for each segment. Here, the magnitudes of feature amounts are compared in the same segment based on the feature amount I, and the histogram classes (prediction error) are associated with the magnitudes of the feature amounts in accordance with a rule determined by the sequence identification information C3 from among the aforementioned plurality of predetermined rules. Next, all pixels in the processing block are associated with the prediction error distribution, the prediction error distribution corresponding to each pixel is added to the intra prediction value H, and a result thereof is used as the intra prediction value E.

With the above-described moving image coding device CC and moving image decoding device DD, the following effect can be achieved in addition to the above-described effect that can be achieved by the moving image coding device AA and the moving image decoding device BB according to the first embodiment of the present invention.

The moving image coding device CC and the moving image decoding device DD each select one of the plurality of rules for each processing block, and determine a pixel for reflecting the prediction error in the prediction value thereof in accordance with the selected rule. For this reason, a change in the pixel value, in which pixel value correlation among pixels in the processing block is considered, can be reflected in the prediction value of an appropriate pixel by selecting a rule that corresponds to the image.

The moving image coding device CC and the moving image decoding device DD each can use a rule for reflecting a large prediction error in a pixel having a large feature amount and a rule for reflecting a large prediction error in a pixel having a small feature amount as the rules defining how to determine, based on the magnitude of the feature amount, the pixel for reflecting the prediction error in the prediction value thereof. For this reason, a change in the pixel value, in which pixel value correlation among pixels in the processing block is considered, can be reflected in the prediction value of an appropriate pixel by selecting these rules as appropriate.

Note that the present invention can be achieved by recording, in a computer-readable non-transitory storage medium, the processing of the moving image coding device AA/CC and the moving image decoding device BB/DD according to the present invention, and causing the moving image coding device AA/CC and the moving image decoding device BB/DD to read out and execute a program recorded in this storage medium.

Here, for example, a nonvolatile memory such as an EPROM or a flash memory, a magnetic disk such as a hard disk, a CD-ROM, or the like can be applied as the aforementioned storage medium. The program recorded in this storage medium is read out and executed by processors provided in the moving image coding device AA/CC and the moving image decoding device BB/DD.

The aforementioned program may be transmitted from the moving image coding device AA/CC and the moving image decoding device BB/DD in which this program is stored in the storage device to another computer system via a transmission medium or through transmitted waves in the transmission medium. Here, the "transmission medium" that transmits the program refers to a medium having a function of transmitting information, such as a network (communication network) including the Internet or a communication line including a telephone line.

The aforementioned program may be for achieving some of the above-described functions. Furthermore, the aforementioned program may be one that can achieve the above-described functions in combination with a program that is already recorded in the moving image coding device AA/CC and the moving image decoding device BB/DD, i.e., a so-called differential file (differential program).

Although the embodiments of the present invention have been described in detail with reference to the drawings, the detailed configurations are not limited to these embodiments, and also include designs in the scope that does not depart from the gist of the invention.

What is claimed is:

1. A moving image coding device that permits generation of an intra prediction value that is based on an intra prediction direction, comprising:
   a prediction error statistic evaluation unit configured to express, as a parameter, a statistic of a prediction error that is based on the intra prediction direction, and approximate the parameter of the statistic in accordance with a distance from a reference pixel located along the intra prediction direction to a pixel to be processed;
   a prediction value feature amount calculation unit configured to calculate, for a pixel near the pixel to be processed, a feature amount of a prediction value that is based on the intra prediction direction; and
   a prediction value calculation unit configured to estimate a prediction error corresponding to the distance from the reference pixel located along the intra prediction direction to the pixel to be processed using the parameter of the statistic approximated by the prediction error statistic evaluation unit, reflect the prediction error in the prediction value that is based on the intra prediction direction using the feature amount calculated by the prediction value feature amount calculation unit, and generate a new prediction value.

2. The moving image coding device according to claim 1, wherein the prediction error statistic evaluation unit includes:
   a statistic parameter calculation unit configured to evaluate the statistic of the prediction error that is based on the intra prediction direction, and parametrically express the statistic;
   a parameter approximation unit configured to approximate a parameter of the statistic obtained by the statistic parameter calculation unit using an approximation function in accordance with the distance from the reference pixel located along the intra prediction direction to the pixel to be processed; and
   a parameter determination unit configured to estimate the statistic of the prediction error that is based on the intra prediction direction using the approximation function obtained by the parameter approximation unit.

3. The moving image coding device according to claim 2, wherein the statistic parameter calculation unit is further configured to classify a processing block into a plurality of divided blocks in accordance with the distance from the reference pixel located along the intra prediction direction to the pixel to be processed, and evaluate the statistic in each of the plurality of divided blocks, and
   the parameter approximation unit is further configured to approximate the parameter of the statistic by means of linear approximation or polynomial approximation with a representative value of the distance from the reference pixel to the pixel to be processed in each of the plurality of divided blocks as a variable.

4. The moving image coding device according to claim 1, wherein the prediction error statistic evaluation unit is further configured to use, as the statistic, a Laplace distribution expression with respect to a histogram of the prediction error.

5. The moving image coding device according to claim 4, wherein the prediction error statistic evaluation unit is further configured to use, as the parameter of the statistic, an average and a variance of the Laplace distribution.

6. The moving image coding device according to claim 1, wherein the prediction value calculation unit is further configured to estimate the prediction error using the parameter of the statistic,
   compare magnitudes of feature amounts calculated for pixels whose distance from the reference pixel is no smaller than a predetermined lower limit value and is smaller than a predetermined upper limit value by the prediction value feature amount calculation unit among pixels in a processing block, and
   determine a pixel for reflecting the prediction error in a prediction value thereof from among the pixels in the processing block, based on a magnitude of the feature amount.

7. The moving image coding device according to claim 6, wherein the prediction value calculation unit is further configured to have, in advance, a plurality of rules that define how to determine, based on the magnitude of the feature amount, the pixel for reflecting the prediction error in the prediction value thereof, and select one of the plurality of rules for each processing block, and determine the pixel for reflecting the prediction error in the prediction value thereof, in accordance with the selected rule.

8. The moving image coding device according to claim 7, wherein the prediction value calculation unit is further configured to have, as the plurality of rules, a rule for reflecting a large prediction error in a pixel having a large feature amount, and a rule for reflecting a large prediction error in a pixel having a small feature amount.

9. The moving image coding device according to claim 1, wherein the prediction value calculation unit is further configured to add the prediction error to the prediction value that is based on the intra prediction direction, and generate a new prediction value.

10. The moving image coding device according to claim 1, wherein, regarding prediction values of pixels corresponding to a diamond-shaped tap with a pixel whose feature amount is to be calculated as the center, the prediction value feature amount calculation unit is further configured to use an average value of the prediction values of the respective pixels in the tap as the feature amount.

11. The moving image coding device according to claim 1, wherein the prediction value feature amount calculation unit is further configured to use, as the feature amount, a value obtained by multiplying an average value of prediction values of respective pixels in a diamond-shaped tap with a pixel whose feature amount is to be calculated as the center by a coefficient corresponding to the distance from the reference pixel to the pixel whose feature amount is to be calculated.

12. A moving image decoding device that permits generation of an intra prediction value that is based on intra prediction, comprising:
a statistic parameter determination unit configured to estimate a statistic of a prediction error that is based on an intra prediction direction using an approximated value of a parameter of the statistic of the prediction error;
a prediction value feature amount calculation unit configured to calculate, regarding a prediction value obtained by prediction that is based on the intra prediction direction, a feature amount of a prediction value at a pixel near a pixel to be processed; and
a prediction value calculation unit configured to estimate a prediction error corresponding to a distance from a reference pixel to the pixel to be processed using the parameter of the statistic obtained by the statistic parameter determination unit, reflect the prediction error in the prediction value that is based on the intra prediction direction using the feature amount calculated by the prediction value feature amount calculation unit, and generate a new prediction value.

13. The moving image decoding device according to claim 12, wherein the statistic parameter determination unit is further configured to use, as the statistic, a Laplace distribution expression with respect to a histogram of the prediction error.

14. The moving image decoding device according to claim 13,
wherein the statistic parameter determination unit is further configured to use, as the parameter of the statistic, an average and a variance of the Laplace distribution.

15. The moving image decoding device according to claim 12,
wherein the prediction value calculation unit is further configured to estimate the prediction error using the parameter of the statistic,
compare magnitudes of feature amounts calculated for pixels whose distance from the reference pixel is no smaller than a predetermined lower limit value and is smaller than a predetermined upper limit value by the prediction value feature amount calculation unit among pixels in a processing block, and
determine a pixel for reflecting the prediction error in a prediction value thereof from among the pixels in the processing block, based on a magnitude of the feature amount.

16. The moving image decoding device according to claim 15,
wherein the prediction value calculation unit is further configured to have, in advance, a plurality of rules that define how to determine, based on the magnitude of the feature amount, the pixel for reflecting the prediction error in the prediction value thereof, and
select one of the plurality of rules for each processing block, and determine the pixel for reflecting the prediction error in the prediction value thereof, in accordance with the selected rule.

17. The moving image decoding device according to claim 16,
wherein the prediction value calculation unit is further configured to have, as the plurality of rules, a rule for reflecting a large prediction error in a pixel having a large feature amount, and a rule for reflecting a large prediction error in a pixel having a small feature amount.

18. The moving image decoding device according to claim 12,
wherein the prediction value calculation unit is further configured to add the prediction error to the prediction value that is based on the intra prediction direction, and generate a new prediction value.

19. The moving image decoding device according to claim 12,
wherein, regarding prediction values of pixels corresponding to a diamond-shaped tap with a pixel whose feature amount is to be calculated as the center, the prediction value feature amount calculation unit is further configured to use an average value of the prediction values of the respective pixels in the tap as the feature amount.

20. The moving image decoding device according to claim 12,
wherein the prediction value feature amount calculation unit is further configured to use, as the feature amount, a value obtained by multiplying an average value of prediction values of respective pixels in a diamond-shaped tap with a pixel whose feature amount is to be calculated as the center by a coefficient corresponding to the distance from the reference pixel to the pixel whose feature amount is to be calculated.

21. A method for coding a moving image in a moving image coding device that permits generation of an intra prediction value that is based on an intra prediction direction, the method comprising:

expressing, as a parameter, a statistic of a prediction error that is based on the intra prediction direction, and approximating the parameter of the statistic in accordance with a distance from a reference pixel located along the intra prediction direction to a pixel to be processed;

calculating, for a pixel near the pixel to be processed, a feature amount of a prediction value that is based on the intra prediction direction; and estimating a prediction error corresponding to the distance from the reference pixel located along the intra prediction direction to the pixel to be processed using the approximated parameter of the statistic, reflecting the prediction error in the prediction value that is based on the intra prediction direction using the feature amount, and generating a new prediction value.

22. A method for decoding a moving image in a moving image decoding device that permits generation of an intra prediction value that is based on intra prediction, the method comprising:

estimating a statistic of a prediction error that is based on an intra prediction direction using an approximated value of a parameter of the statistic of the prediction error;

calculating, regarding a prediction value obtained by prediction that is based on the intra prediction direction, a feature amount of a prediction value at a pixel near a pixel to be processed; and estimating a prediction error corresponding to a distance from a reference pixel to the pixel to be processed using the parameter of the statistic, reflecting the prediction error in a prediction value that is based on the intra prediction direction using the feature amount, and generating a new prediction value.

23. A non-transitory computer readable storage medium including program for causing a computer to execute a method for coding a moving image in a moving image coding device that permits generation of an intra prediction value that is based on an intra prediction direction, the method comprising:

expressing, as a parameter, a statistic of a prediction error that is based on the intra prediction direction, and approximating the parameter of the statistic in accordance with a distance from a reference pixel located along the intra prediction direction to a pixel to be processed;

calculating, for a pixel near the pixel to be processed, a feature amount of a prediction value that is based on the intra prediction direction; and estimating a prediction error corresponding to the distance from the reference pixel located along the intra prediction direction to the pixel to be processed using the approximated parameter of the statistic, reflecting the prediction error in the prediction value that is based on the intra prediction direction using the feature amount, and generating a new prediction value.

24. A non-transitory computer readable storage medium including program for causing a computer to execute a method for decoding a moving image in a moving image decoding device that permits generation of an intra prediction value that is based on intra prediction, the method comprising:

estimating a statistic of a prediction error that is based on an intra prediction direction using an approximated value of a parameter of the statistic of the prediction error;

calculating, regarding a prediction value obtained by prediction that is based on the intra prediction direction, a feature amount of a prediction value at a pixel near a pixel to be processed; and estimating a prediction error corresponding to a distance from a reference pixel to the pixel to be processed using the parameter of the statistic, reflecting the prediction error in a prediction value that is based on the intra prediction direction using the feature amount, and generating a new prediction value.

\* \* \* \* \*